(12) United States Patent
Jordan

(10) Patent No.: US 9,601,085 B2
(45) Date of Patent: Mar. 21, 2017

(54) DEVICE AND METHOD FOR SYNCHRONIZING DISPLAY AND TOUCH CONTROLLER WITH HOST POLLING

(71) Applicant: SYNAPTICS INCORPORATED, San Jose, CA (US)

(72) Inventor: Joel Jordan, Sunnyvale, CA (US)

(73) Assignee: Synaptics Incorporated, San Jose, CA (US)

( * ) Notice: Subject to any disclaimer, the term of this patent is extended or adjusted under 35 U.S.C. 154(b) by 291 days.

(21) Appl. No.: 14/033,068

(22) Filed: Sep. 20, 2013

(65) Prior Publication Data

US 2015/0084908 A1    Mar. 26, 2015

(51) Int. Cl.
*G09G 5/12*     (2006.01)
*G06F 3/041*    (2006.01)
*G09G 5/08*     (2006.01)

(52) U.S. Cl.
CPC ............ *G09G 5/12* (2013.01); *G06F 3/0418* (2013.01); *G09G 5/08* (2013.01); *G09G 2354/00* (2013.01); *G09G 2370/08* (2013.01)

(58) Field of Classification Search
CPC ............................. G06F 3/0416; G06F 3/0412
USPC .......................... 345/204, 173–174, 158, 87; 178/18.01–18.09; 359/290
See application file for complete search history.

(56) References Cited

U.S. PATENT DOCUMENTS

| | | | |
|---|---|---|---|
| 8,436,806 B2 | 5/2013 | Almalki et al. | |
| 2005/0146511 A1* | 7/2005 | Hill et al. | 345/173 |
| 2005/0213593 A1 | 9/2005 | Anderson et al. | |
| 2006/0244732 A1* | 11/2006 | Geaghan | 345/173 |
| 2010/0117987 A1* | 5/2010 | Lin et al. | 345/174 |
| 2010/0295564 A1* | 11/2010 | Reynolds | 324/686 |
| 2012/0223911 A1 | 9/2012 | Westhues | |

* cited by examiner

*Primary Examiner* — Shaheda Abdin
(74) *Attorney, Agent, or Firm* — Osha Liang LLP

(57) ABSTRACT

Devices, systems, and methods are provided for coordinating the interaction between a touch screen controller and a display controller in an electronic device of the type including a host processor, a touch screen controller configured to acquire capacitive measurements from a touch screen, and a display controller configured to update a display at a refresh frequency and phase. The method includes: sharing a synchronization signal between the display controller and the host processor, the synchronization signal indicative of the refresh frequency and phase; polling the touch screen controller, by the host processor, based on the synchronization signal; and in response to the polling, acquiring the capacitive measurements by the touch screen controller at a sampling rate and phase determined by the refresh frequency and phase.

19 Claims, 5 Drawing Sheets

DEVICE AND METHOD FOR SYNCHRONIZING DISPLAY AND TOUCH CONTROLLER WITH HOST POLLING

FIELD OF THE INVENTION

This invention generally relates to electronic devices, and more specifically relates to sensor devices and using sensor devices for producing user interface inputs.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Presently known capacitive sensing devices are limited in their ability to effectively synchronize the touch controller with the display controller. The time delay between touch data collection and the subsequent processing and display of the touch data is referred to as latency. Low levels of constant latency are generally imperceptible to the user. However, variations in latency can cause the display to appear jerky or clumsy as the on-screen user interface element (e.g., a cursor, scrolling or dragging feature) imperfectly tracks or follows the user's finger movement. This "judder" tends to compromise the perceived smoothness of the user interface experience. Attempts to synchronize the acquisition of touch data with the display refresh rate have had limited success inasmuch as the touch screen controller typically does not have direct access to the display screen controller. Thus, there exists a need for capacitive sensing devices that mitigate or eliminate judder without requiring additional hardware connections between the touch screen controller and the display controller.

BRIEF SUMMARY

The embodiments of the present invention provide a device and method that facilitates improved device usability. Specifically, the device and method provide improved user interface functionality by reducing judder, for example, by employing a "virtual wire" between the display controller and the touch controller to implement host polling. That is, the touch controller driver operating on the host may be configured to intercept a display refresh signal (e.g., the VSYNC signal shared between the host and the display controller), and use it to trigger a polling request from the host to the touch controller. In this way, a fixed (constant) phase relationship may be maintained between the touch data acquisition rate and the display refresh rate without requiring additional hardware, thereby mitigating judder and enhancing the user interface experience

BRIEF DESCRIPTION OF DRAWINGS

The preferred exemplary embodiment of the present invention will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability and an enhanced user interface experience. The user interface experience may be enhanced by synchronizing the operation of the touch controller with the operation of the display controller. Specifically, the device and method of the present invention employ a "virtual wire" between the display controller and the touch controller to implement host polling. That is, the touch controller driver operating on the host may be configured to intercept a display refresh signal (e.g., the VSYNC signal shared between the host and the display controller), and use it to trigger a polling request from the host to the touch controller. In this way, a fixed (constant) phase relationship may be maintained between the touch data acquisition rate and the display refresh rate without requiring additional hardware, thereby mitigating judder and enhancing the user interface experience.

Figure 1:
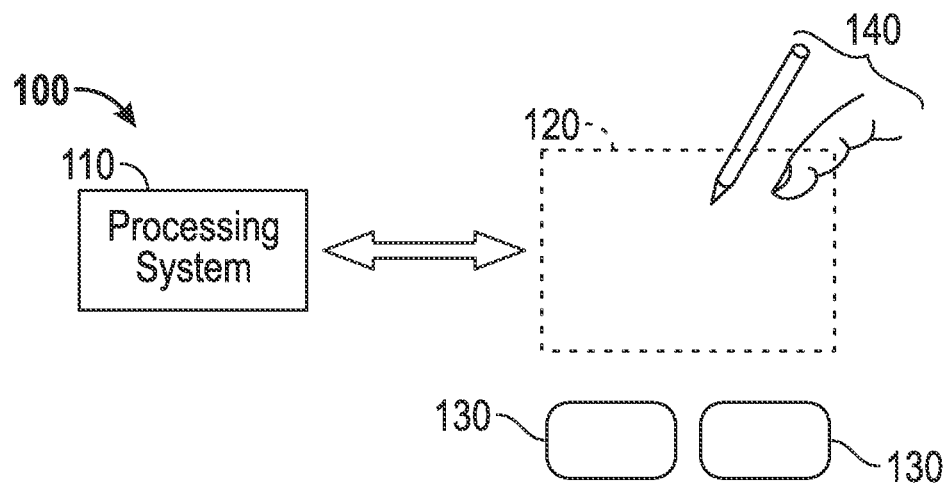
FIG. 1 is a block diagram of an exemplary system that includes an input device in accordance with an embodiment of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, and RF.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
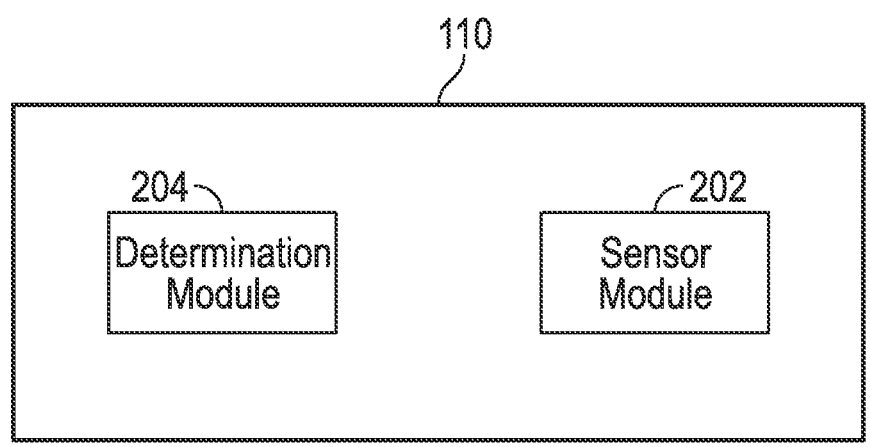
FIG. 2 is a block diagram of a processor including a sensor module and a determination module in accordance with an embodiment of the invention.

Referring now to FIGS. 1 and 2, the processing system 110 includes a sensor module 202 and a determination module 204. Sensor module 202 is configured to receive frames of data (referred to as resulting signals) from the sensor electrodes associated with sensing region 120. Determination module 204 is configured to process the data, and to determine first positional information for an input object in the first portion of the sensing region (away from the surface) based on a difference between a first frame of a first plurality of frames and a filtered frame, even when the input object is determined to be in the sensing region when the first plurality of frames are acquired, wherein the filtered frame is based on one or more of the first plurality of frames, and wherein the second portion of the sensing region is between the surface and the first portion.

By configuring the processing system 110 in this way, the input device 100 can reliably determine positional information for input objects that are away from the surface using the same sensor electrodes that are used to determine positional information for input objects at the surface without the need for the static baseline measurements associated with prior art schemes.

The embodiments of the invention can be used to enable a variety of different capabilities on the input device. Specifically, it can be used to enable the same input device that is used for cursor positioning, scrolling, dragging, and icon selection, and other user input at the surface, to receive input in the form of objects above the surface. As one specific example, a touch screen or other capacitive sensing device can be adapted to close windows on a desktop, put a computer into sleep mode, or perform some other type of mode switch in response to the user swiping a hand over the sensor. As will be described in greater detail, different actions can be configured to occur in response to swipes in different directions. Additionally, the input device can be configured to reject or ignore swipes that are more likely to be inadvertent motions. The input device can also be configured to detect presence, approach, and departure of input objects.

As noted above, the embodiments of the invention can be implemented with a variety of different types and arrangements of capacitive sensor electrodes. To name several examples, the input device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the sensor electrodes for both the X and Y sensing can be formed on the same layer. In yet other embodiments, the sensor electrodes can be arranged for sensing in only one direction, e.g., in either the X or the Y direction. In still another embodiment, the sensor electrodes can be arranged to provide positional information in polar coordinates, such as "r" and "0" as one example. In these embodiments the sensor electrodes themselves are commonly arranged in a circle or other looped shape to provide "0", with the shapes of individual sensor electrodes used to provide "r".

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

In a typical electronic system including a touch screen, a display, a host (device) controller, a touch screen controller, and a display controller, the touch screen controller periodically samples the touch screen and provides touch screen data to the host controller which, in turn, processes the touch screen data and provides the processed data to the display controller for presentation by the display. Typical display refresh rates may range from a few Hz to 120 Hz, and often about 60 Hz; that is, the display is refreshed at a rate of 60 frames per second. Touch screen sampling rates may range from about 60 Hz to about 120 Hz, and typically about 100 Hz. Because the touch controller typically operates independently of the display controller, in presently known systems the touch screen data gathering (sampling) function is often implemented asynchronously with respect to the display refresh rate.

More particularly, in accordance with presently known protocols used by a host to communicate with a touch controller, typically only the host can initiate a communication with the touch controller using a communications bus (e.g., the clock and data lines). When it is desired for the touch controller to alert the host that a touch data frame is ready for the host to read, the touch controller may send a "ready" signal to the host using the ATTN line (or signal wire), which alerts the host to retrieve the data. This scheme is advantageous in that when a finger first arrives at the touch surface, the phone or other device may be asleep and needs to be alerted that data is present. Using the ATTN line as a prompt allows the phone can wake itself up and begin processing the touch data. However, the asynchronous nature of this scheme introduces undesirable judder.

In accordance with various embodiments, it is desirable to reduce the latency between capturing the touch information, on the one hand, and processing and displaying the touch information, on the other hand, to thereby reduce the perceived delay between finger movement on the touch screen and the corresponding cursor movement on the display. It is also desirable to synchronize the collection of touch data with the display of the processed touch data, to produce a smooth cursor response to finger motion. That is, when the touch controller samples the touch screen at a different rate from the display refresh rate (i.e., asynchronously), the velocity of the on screen user interface element imperfectly tracks the velocity of the user's finger, resulting in choppy or cumbersome movement of the user interface element in response to smooth finger motion.

Reducing the effects of latency and asynchronous (or out of phase) operation allows the on screen user interface element (e.g., cursor) to track the user's finger motion smoothly and in real time (or near real time). In an embodiment, the touch control driver operated by the host is configured to instruct the touch controller to successive frames of sampled touch information in phase with and at the same rate as, or at an integer multiple of, the display refresh rate. In this way, the motion of the on screen user interface element may closely track the motion of the user's finger (or other input object) as it moves across the touch surface, reducing judder and producing a smooth user interface experience.

Figure 3:
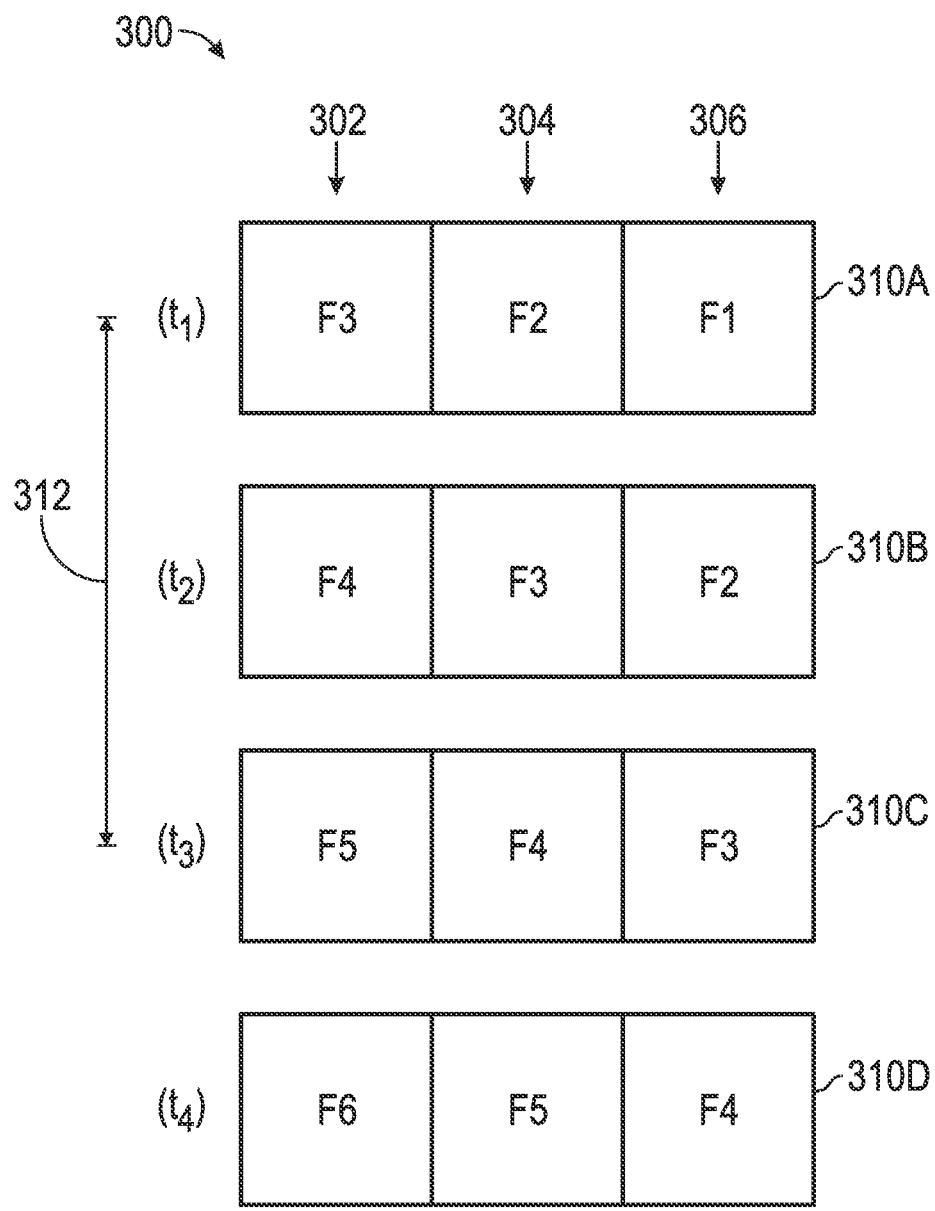
FIG. 3 is a schematic view of an exemplary three stage sensing, processing, and display pipeline illustrating inherent latency in accordance with an embodiment of the invention.

Referring now to FIG. 3, a schematic view of an exemplary three stage pipeline 300 includes a temporally sequential sample stage 302, a processing stage 304, and a display stage 306. More particularly, the touch data is sampled (retrieved) from the touch sensor 120 during the sample stage 302. During the subsequent processing stage 304, the previously sampled data is processed by the touch controller and/or the host processor. Finally, the processed data is displayed in stage 306.

At a first time $t_1$, the pipeline contains a first data sequence 310A including respective data frames F1, F2, and F3. At a second time $t_2$, the pipeline contains a second data sequence 310B including respective data frames F2, F3, and F4. At a third time $t_3$, the pipeline contains a third data sequence 310C including respective data frames F3, F4, and F5. At a fourth time $t_4$, the pipeline contains a fourth data sequence 310D including includes respective data frames F4, F5, and F6. Each data frame FX represents touch information retrieved from the touch sensor 120.

More particularly and with continued reference to FIG. 3, at time $t_1$ the data frame F3 represents the most recent touch information sampled from the touch screen 120; the data frame F2 represents the immediately previously sampled touch data which is being processed by the touch controller and/or host processor; and the data frame F1 represents the previously processed data presented for display. Similarly, at time $t_2$ the data frame F4 represents the current sampled touch information; the data frame F3 represents the data being processed; and the data frame F2 represents the displayed data, and so on. Stated another way, at time $t_1$ the data frame F3 is sampled, at time $t_2$ the data frame F3 is processed, and at time $t_3$ the data frame F3 is displayed. Thus, it can be seen that the inherent latency 312 between the time a data frame is captured and when it is displayed is two processing cycles in the illustrated embodiment.

Figure 4:
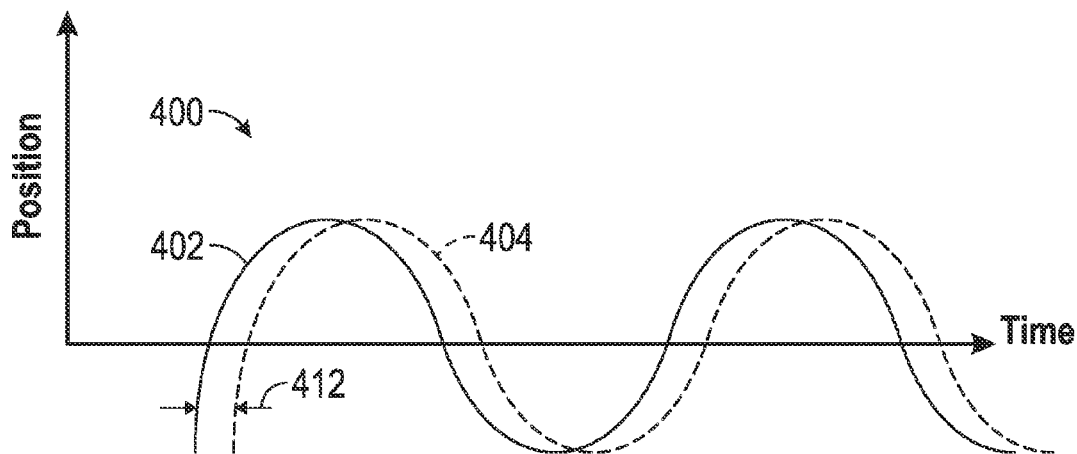
FIG. 4 is a graphical depiction of finger movement and corresponding cursor movement versus time illustrating the latency shown in FIG. 3 in accordance with an embodiment of the invention.

FIG. 4 is a graphical depiction of finger position and corresponding cursor position plotted versus time to illustrate the latency described in connection with FIG. 3. In particular, the uniform motion of a finger sliding up and down on a touch screen over time may be modeled as a sine curve 402. A plot 404 of cursor position versus time is superimposed on sine curve 402 to illustrate the latency 412 (analogous to latency 312 of FIG. 3) associated with the on screen cursor motion 404 as it tracks finger movement. Those skilled in the art will appreciate that a small amount of latency, particularly a constant latency, is relatively imperceptible and does not significantly compromise the user interface experience. Latency which varies over time, however, may produce judder.

Figure 5:
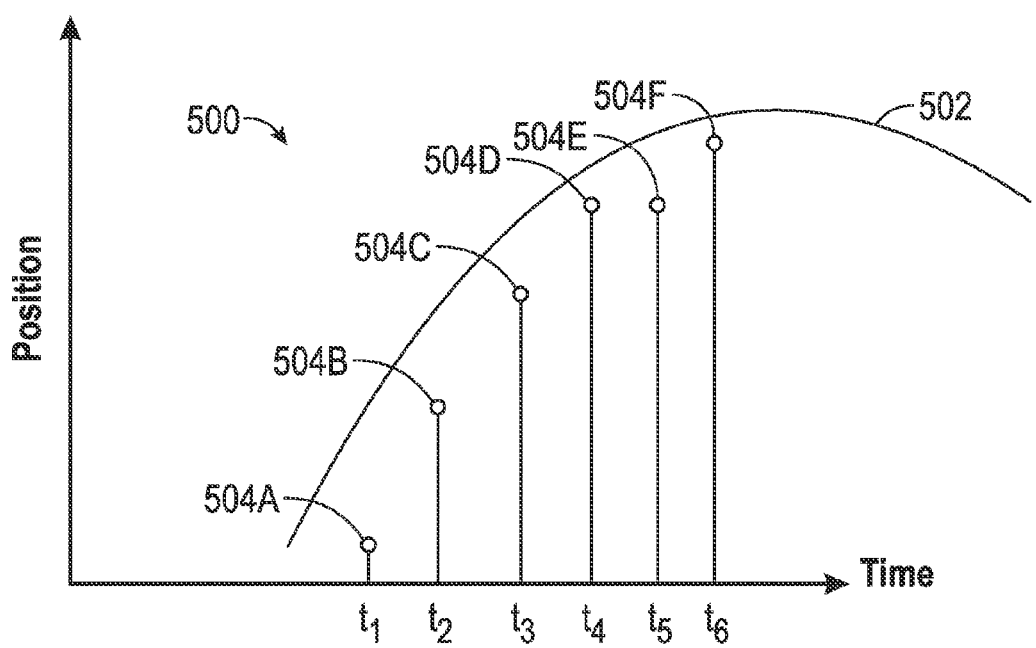
FIG. 5 is an enlarged segment of the graph shown in FIG. 4 illustrating judder in accordance with an embodiment of the invention.

Referring now to FIG. 5, an enlarged segment of the graph shown in FIG. 4 illustrates judder resulting from asynchronous operation of the touch controller with respect to the display controller. More particularly, a plot of finger position 502 versus time is juxtaposed with successive corresponding cursor positions 504A-E. Cursor positions 504A-D correspond to the condition in which the display refreshes synchronously (in phase) with the sampling (retrieval) of new touch information and, thus, the transitions from cursor position 504A through 504 D appear smooth. The transition from cursor position 504D to 504E, however, corresponds to the condition in which the display controller refreshed the display before new frame of touch data was received by the touch controller from the host, resulting in a temporarily "stuck" cursor. Accordingly, the same cursor position is displayed twice (504D, E). Thereafter, as a new data frame is processed by the host and the touch controller, the cursor position 504F appears to jump ahead. The resulting judder is distracting to the user. Devices and methods for maintaining a constant phase relationship between the touch controller and the display controller to thereby reduce judder will now be described in connection with FIGS. 6 and 7.

Figure 6:
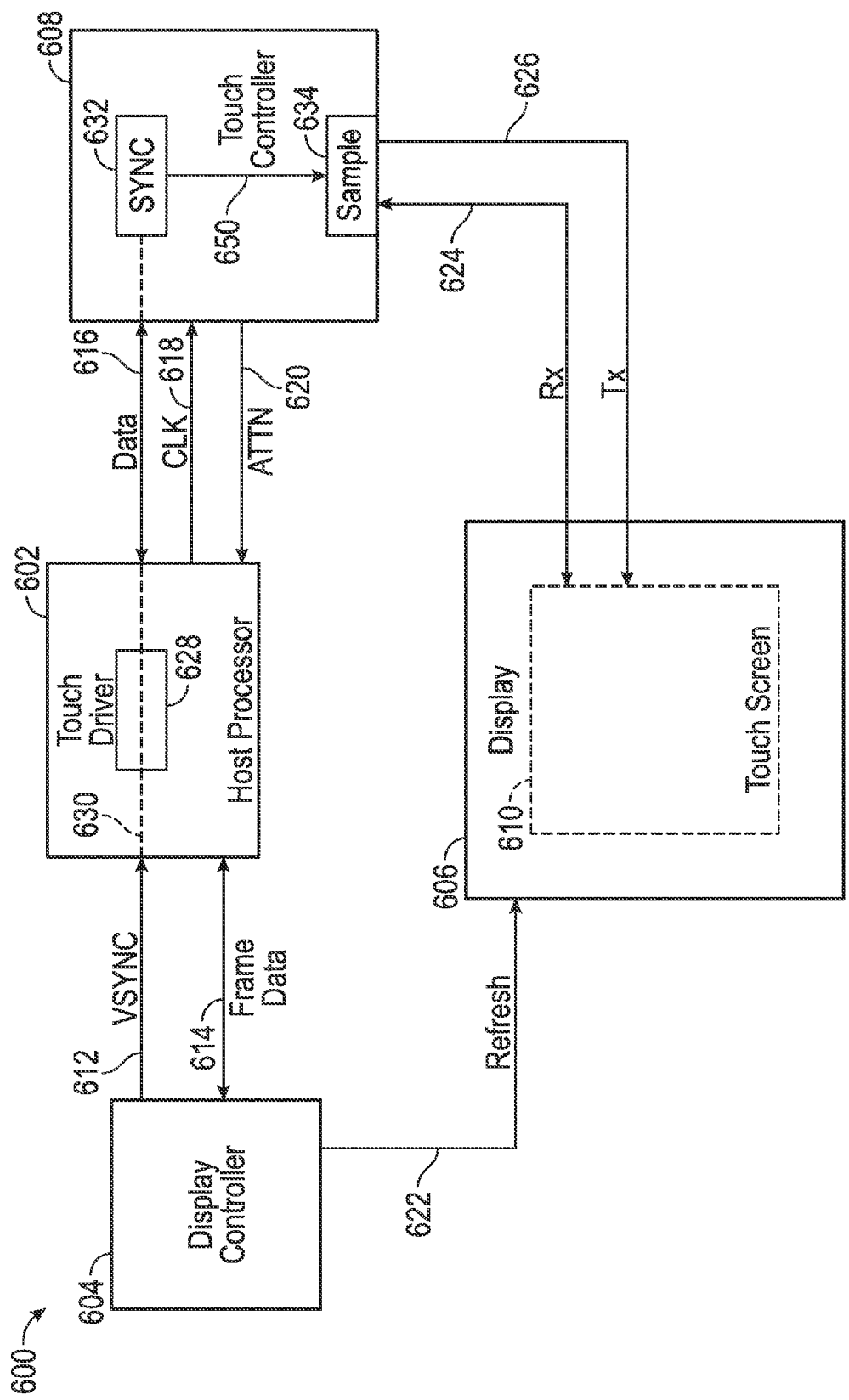
FIG. 6 is a schematic block diagram of an electronic device including a host processor, a touch screen, a display, a touch screen controller, and a display controller in accordance with an exemplary embodiment of the invention.

FIG. 6 is a schematic block diagram of an electronic device 600 including a host processor 602, a display controller 604, a display 606, a touch screen controller 608, and a touch screen 610 which may (but need not) overlay the display 606. The host 602 communicates with the display controller 604 using a communications bus. In the illustrated embodiment, the host 602 may communicate with the display controller 604 via a bidirectional data line 614 and a VSYNC line 612. The host 602 sends a clock signal to the touch controller 608 on a clock line 618, and the host 602 is configured to receive an ATTN signal from the touch controller 608 on an ATTN line 620. A bidirectional data line 616 extends between the host 602 and the touch controller 608. In the context of this disclosure, the term "line" may be used interchangeably with the term "signal wire".

The host 602 also includes a touch control driver 628 which coordinates communication between the host and the touch controller. As described in greater detail below, the driver 628 implements a "virtual wire" 630 which applies the VSYNC signal from the display controller 604 to the touch controller 608 to maintain fixed phase operation between the display controller 604 and the touch controller 608. In an embodiment, the touch controller 608 also includes a synchronization module 632 and a data acquisition module 634. In an embodiment, the synchronization module 632 implements a phase lock loop (PLL), a delay lock loop (DLL), or any other suitable technique or algorithm for maintaining synchronous and/or fixed phase operation between the touch controller 608 and the display controller 604. In another embodiment, the constant (fixed) phase relationship may be adjusted to account for inherent processing latency.

With continued reference to FIG. 6, the touch controller communicates with the touch screen 610 (analogous to the sensor 120 in FIG. 1) via data lines 624 and 626. In an embodiment, the data line 626 is configured to drive transmitter electrodes, and the data line 624 is configured to retrieve touch information from receiver electrodes and provide touch data to the data acquisition module 634. The touch controller transmits the touch information (analogous to the data frames F1-F6 described in connection with FIG. 3) to the host 602 via data line 616, whereupon the host processes the data and provides data frames to the display controller via data line 614. The display controller refreshes the display 606 by updating the data using a refresh data line 622.

In an embodiment, the data acquisition module 634 samples the touch information in accordance with a timing signal 650 from the synchronizing module 632. Synchronizing module 632, in turn, outputs the timing signal 650 based on a synchronization signal received from the host 602 on data line 616. This is referred to as a "host polling" scheme, inasmuch as the host 602 prompts (or polls) the touch controller to sample the touch screen.

With continued reference to FIG. 6, the display controller 604 sends a pulse to the host 602 over the VSYNC line 612 identifying each display refresh cycle. This ensures synchronous, phase locked interaction between the display controller 604 and the host 602. However, the VSYNC line 612 is typically not routed to or otherwise conveniently available for use by the touch controller 608, in part because the touch controller 608 is essentially is essentially regarded as a plug and play component for many hand held and portable devices such as smart phones, tablets, lap tops, and the like. In order to synchronize the operation of the touch controller 608 with the refresh cycle of the display controller in accordance with various embodiments, the touch driver 628 may be configured to implement a virtual wire 630 from the VSYNC line 612 to the data line 616. That is, the software comprising the driver 628 may be configured to route the VSYNC signal (received from the display controller) 604 to the touch controller 608, for example, via the data line 616. In this way, latency may be minimized. Moreover, the touch controller may thereby operate synchronously with—and in phase with—the display controller 604 without having to add additional hardware, wires, or data ports to the device 600.

In addition, when the host 602 is awakened from a sleep (doze) state in response to and ATTN signal from the touch controller 608, the host 602 may be configured to immediately initiate host polling of the touch controller 608, as described above.

Figure 7:
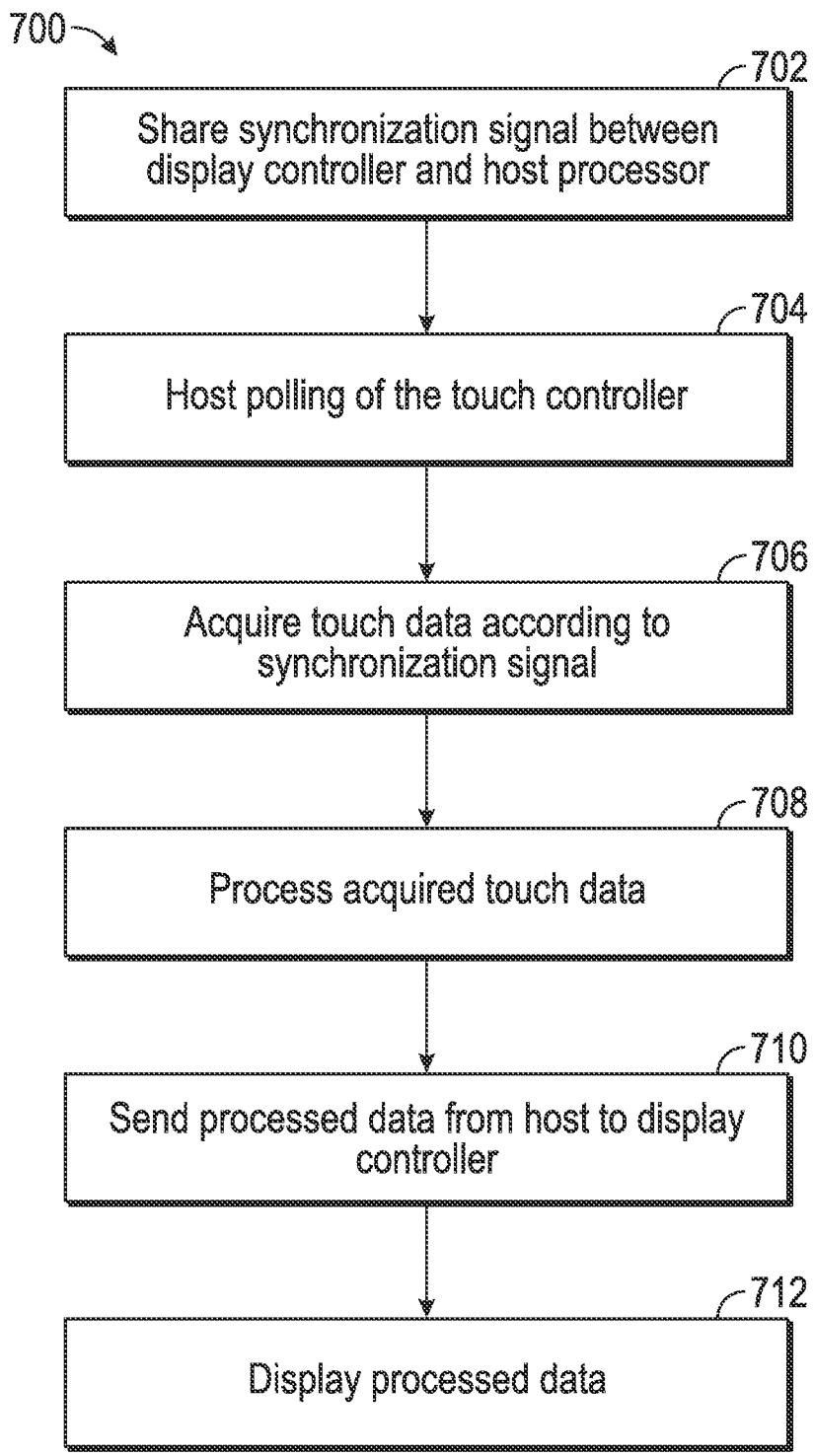
FIG. 7 is a flow diagram of an exemplary method of synchronizing the operation of the touch controller with the operation of the display controller of FIG. 6 using host polling in accordance with an embodiment of the invention.

FIG. 7 is a flow diagram of an exemplary method 700 of synchronizing the operation of the touch controller with the operation of the display controller of FIG. 6 using host polling. More particularly, the method involves sharing a synchronization signal between a display controller and a host processor (Task 702), and polling the touch controller by the host processor (Task 704). The method 700 further involves acquiring touch data from the touch screen in accordance with synchronization signal (Task 706), and thereafter processing the acquired data (Task 708). The method 700 further involves sending the processed data from the host to the display controller (Task 710), whereupon the processed data is displayed (Task 712).

A device and method are thus provided for coordinating the interaction between a touch screen controller and a display controller in an electronic device of the type including a host processor, a touch screen controller configured to acquire capacitive measurements from a touch screen, and a display controller configured to update a display at a refresh frequency and phase. The method includes: sharing a synchronization signal between the display controller and the host processor, the synchronization signal indicative of the refresh frequency and phase; polling the touch screen controller, by the host processor, based on the synchronization signal; and in response to the polling, acquiring the capacitive measurements by the touch screen controller at a sampling rate and phase determined by the refresh frequency and phase.

In an embodiment, sharing comprises sending the synchronization signal from the display controller to the host processor, and acquiring may include sampling capacitive measurements from the touch screen, processing the sampled measurements using the touch screen controller, and sending the processed measurements in the form of data frames to the host processor.

In another embodiment, the refresh frequency comprises an integer multiple of the sampling rate.

In a further embodiment, the electronic device is of the type which includes a software driver running on the host processor and configured to coordinate communication between the touch screen controller and the host processor; and the touch screen controller is in the form of a hardware module which is separate from the host processor.

In an embodiment, the synchronization signal comprises a VSYNC signal sent from the display controller to the host processor at the sampling frequency.

In another embodiment, the electronic device is of the type which further includes a communications bus extending between the host processor and the touch screen controller, and wherein polling comprises sending a data request from the host processor to the touch controller using the communications bus.

In a further embodiment, the method includes sending, in response to the data request, a data frame comprising indicia of a capacitive measurement from the touch screen controller to the host processor.

In a further embodiment, the method includes sending, in response to sending the data frame to the host processor, refresh image data to be displayed from the host processor to the display controller.

In yet a further embodiment, the electronic device is of the type which includes an attention signal wire extending from the touch screen controller to the host processor; the host processor is configured to enter a sleep mode following a predetermined period of inactivity and to suspend polling during sleep mode; and the touch screen controller is configured to wake the host processor from sleep mode using the attention line in response to detection of an input object interacting with the touch screen during sleep mode.

In another embodiment, the method includes resuming polling by the host processor upon being awakened by the touch screen controller.

In another embodiment, the method includes synchronizing, by the touch screen controller in response to polling, the sampling rate to the refresh frequency.

In a further embodiment, synchronizing comprises maintaining synchronous operation between the touch screen controller and the display controller using a feedback loop to maintain synchronous phase operation.

A further embodiment of the method includes: configuring a driver module to intercept the synchronization signal operating between the display controller and the host processor, generate a polling signal based on the synchronization signal, and send the polling signal to the touchscreen controller; and installing the driver module on the host processor for operation by the host processor.

In an embodiment, the touch screen at least partially overlays the display screen.

A method is also provided for coordinating interaction between a touch controller operating at a sampling rate and a display controller operating at a refresh frequency. The method includes: configuring a driver to detect synchronization signals indicative of the refresh frequency and phase, and to generate polling requests based on the synchronization signals; receiving the polling requests by the touch controller; and in response to the polling requests, adapting the sampling rate and phase to the refresh frequency and phase.

In an embodiment, adapting comprises synchronizing the sampling rate to the refresh frequency such that the refresh frequency comprises an integer multiple of the sampling rate.

In another embodiment, synchronizing comprises maintaining synchronous operation between the touch controller and the display controller using at least one of a phase lock loop and a delay lock loop.

A further embodiment of the method includes, in response to the polling requests, sending corresponding respective data frames from the touch controller to the display controller, the data frames comprising information relating to at least one object interacting with a touch screen associated with the touch controller.

A processing system is provided for a capacitive sensing device, the processing system configured to: acquire a touch data frames from the sensing device at a sensing rate; receive polling requests form a host processor at a refresh frequency; and synchronize the sensing rate to the refresh frequency.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A method for coordinating the interaction between a touch screen controller and a display controller in an electronic device of the type including a host processor, the touch screen controller configured to acquire capacitive measurements from a touch screen, and the display controller configured to update a display at a refresh frequency and phase, the method comprising:
   sending a synchronization signal from the display controller to the host processor, the synchronization signal indicative of the refresh frequency and phase, the synchronization signal comprising a VSYNC signal;
   polling the touch screen controller, by the host processor, as triggered by the synchronization signal; and
   in response to the polling, acquiring the capacitive measurements by the touch screen controller at a sampling rate and phase determined by the refresh frequency and phase.

2. The method of claim 1, wherein acquiring comprises sampling capacitive measurements from the touch screen, processing the sampled measurements using the touch screen controller, and sending the processed measurements in the form of data frames to the host processor.

3. The method of claim 1, wherein the refresh frequency comprises an integer multiple of the sampling rate.

4. The method of claim 1, wherein:
   the electronic device is of the type which further includes a software driver running on the host processor and configured to coordinate communication between the touch screen controller and the host processor; and
   the touch screen controller comprises a hardware module which is separate from the host processor.

5. The method of claim 1, wherein the VSYNC signal is sent at the sampling frequency.

6. The method of claim 1, wherein the electronic device is of the type which further includes a communications bus extending between the host processor and the touch screen controller, and wherein polling comprises sending a data request from the host processor to the touch controller using the communications bus.

7. The method of claim 6, further comprising sending, in response to the data request, a data frame comprising indicia of a capacitive measurement from the touch screen controller to the host processor.

8. The method of claim 7, further comprising sending, in response to sending the data frame to the host processor, refresh image data to be displayed from the host processor to the display controller.

9. The method of claim 1, wherein:
   the electronic device is of the type which further includes an attention signal wire extending from the touch screen controller to the host processor;
   the host processor is configured to enter a sleep mode following a predetermined period of inactivity and to suspend polling during sleep mode; and
   the touch screen controller is configured to wake the host processor from sleep mode using the attention line in response to detection of an input object interacting with the touch screen during sleep mode.

10. The method of claim 9, further comprising resuming polling by the host processor upon being awakened by the touch screen controller.

11. The method of claim 1, further comprising synchronizing, by the touch screen controller in response to polling, the sampling rate to the refresh frequency.

12. The method of claim 11, wherein synchronizing comprises maintaining synchronous operation between the touch screen controller and the display controller using a feedback loop to maintain synchronous phase operation.

13. The method of claim 1, further comprising:
   configuring a driver module to intercept the synchronization signal operating between the display controller and the host processor, generate a polling signal based on the synchronization signal, and send the polling signal to the touchscreen controller; and
   installing the driver module on the host processor for operation by the host processor.

14. The method of claim 1, wherein the touch screen at least partially overlays the display screen.

15. An input device comprising:
   a touch controller operating at a sampling rate;
   a display controller operating at a refresh frequency; and
   a host controller configured to detect synchronization signals indicative of the refresh frequency and phase from the display controller, and to generate polling requests to the touch controller based on the synchronization signals, the synchronization signals comprising a VSYNC signal;
   wherein the touch controller is configured to adapt the sampling rate and phase to the refresh frequency and phase in response to the polling requests.

16. The input device of claim 15, wherein the touch controller is further configured to synchronize the sampling rate to the refresh frequency such that the refresh frequency comprises an integer multiple of the sampling rate.

17. The input device of claim 15, wherein the touch controller is further configured to maintain synchronous operation between the touch controller and the display controller using at least one of a phase lock loop and a delay lock loop.

18. The input device of claim 15 wherein, in response to the polling requests, the touch controller is configured to send corresponding respective data frames to the display controller, the data frames comprising information relating to at least one object interacting with a touch screen associated with the touch controller.

19. A touch controller for a capacitive sensing device, the touch controller configured to:
   acquire a touch data frames from the capacitive sensing device at a sensing rate;
   receive polling requests from a host processor at a refresh frequency,
   the polling requests being based on a VSYNC signal sent from a display controller to the host processor, the VSYNC signal indicative of the refresh frequency and phase of the display controller; and
   synchronize the sensing rate to the refresh frequency and phase.

* * * * *